United States Patent
Kim et al.

(10) Patent No.: US 9,273,947 B2
(45) Date of Patent: Mar. 1, 2016

(54) SENSING MAGNET APPARATUS FOR MOTOR

(71) Applicant: LG INNOTEK CO., LTD., Seoul (KR)

(72) Inventors: Jung Keun Kim, Seoul (KR); Dong Geun Chang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 180 days.

(21) Appl. No.: 13/673,211

(22) Filed: Nov. 9, 2012

(65) Prior Publication Data
US 2013/0200888 A1 Aug. 8, 2013

(30) Foreign Application Priority Data

Feb. 7, 2012 (KR) .................. 10-2012-0012208
Feb. 7, 2012 (KR) .................. 10-2012-0012209

(51) Int. Cl.
*G01B 7/30* (2006.01)
*F16C 41/00* (2006.01)
*H02K 11/00* (2006.01)
*G01L 3/10* (2006.01)

(52) U.S. Cl.
CPC ............... *G01B 7/30* (2013.01); *F16C 41/007* (2013.01); *H02K 11/0021* (2013.01); *G01L 3/104* (2013.01)

(58) Field of Classification Search
CPC ....... G01P 3/487; F16C 41/007; G01L 3/104; G01B 7/30; H02K 11/0021
USPC ............................................ 324/207.25, 174
See application file for complete search history.

(56) References Cited

U.S. PATENT DOCUMENTS

| | | | |
|---|---|---|---|
| 6,622,674 B2* | 9/2003 | Kobayashi et al. ......... | 123/90.15 |
| 7,010,955 B2* | 3/2006 | Suzuki .................... | G01D 5/145 73/1.75 |
| 7,034,526 B2* | 4/2006 | Shoji et al. ............... | 324/207.25 |
| 7,375,510 B2* | 5/2008 | Miyata et al. ............. | 324/207.25 |
| 2003/0160537 A1* | 8/2003 | Hsu ................................ | 310/254 |
| 2006/0260903 A1* | 11/2006 | Kaneda et al. ................ | 192/100 |
| 2007/0273362 A1* | 11/2007 | Nakajima et al. ............. | 324/174 |
| 2008/0252286 A1* | 10/2008 | Kottmyer et al. ......... | 324/207.25 |
| 2009/0219017 A1* | 9/2009 | Mizuta ...................... | 324/207.25 |

(Continued)

FOREIGN PATENT DOCUMENTS

| | | |
|---|---|---|
| CN | 1619255 A | 5/2005 |
| JP | 03-044157 Y2 | 8/1985 |
| JP | 3738966 B2 | 11/2005 |

(Continued)

OTHER PUBLICATIONS

Office Action dated Jan. 7, 2014 in Japanese Application No. 2012-255897.

(Continued)

*Primary Examiner* — Huy Q Phan
*Assistant Examiner* — Dustin Dickinson
(74) *Attorney, Agent, or Firm* — Saliwanchik, Lloyd & Eisenschenk (57) ABSTRACT

Disclosed is a sensing magnet apparatus for an motor, the apparatus including a disk-shaped plate centrally inserted by a rotation shaft, a ring-shaped sensing magnet so installed as to surface-contact an upper surface of the plate, formed at a position near to a periphery with a main magnet, and formed at a position near to a through hole with a sub magnet, and a separation inhibition unit physically coupling the plate and the sensing magnet to maintain the coupled state between the plate and the sensing magnet.

8 Claims, 7 Drawing Sheets

(56) References Cited

U.S. PATENT DOCUMENTS

2011/0037335 A1* 2/2011 Jang et al. ............... 310/156.32
2011/0126639 A1* 6/2011 Behrens .................. G01L 3/104
73/862.193

FOREIGN PATENT DOCUMENTS

| JP | 2008-206354 A | 9/2008 |
| JP | 2008-253121 A | 10/2008 |
| JP | 2009-254022 A | 10/2009 |

OTHER PUBLICATIONS

Office Action dated Nov. 21, 2014 in Chinese Application No. 201310049915.7.

* cited by examiner

SENSING MAGNET APPARATUS FOR MOTOR

CROSS-REFERENCE TO RELATED APPLICATION

This application claims the benefit under 35 U.S.C. §119 of Korean Patent Application Nos. 10-2012-0012208, filed Feb. 7, 2012, and 10-2012-0012209, filed Feb. 7, 2012, which are hereby incorporated by reference in their entirety.

BACKGROUND

1. Field of the Disclosure

The present disclosure relates to a sending magnet apparatus for motor.

2. Discussion of the Related Art

Generally, almost every vehicle employs an electric power-assist steering system. Such an electric power-assist steering system generates an assist force based on the steering torque and the steering angle, so as to enhance the steering performance of the vehicle.

That is, a steering system that assists a steering force of a vehicle with a separate power is used to enhance the motion stability of a vehicle.

Conventionally, the auxiliary steering device uses hydraulic pressure, but an Electronic Power Steering (EPS) system adapted to transmit a rotation output of an electric motor to a steering shaft via a speed reduction mechanism has been increasingly employed these days from a viewpoint of a reduction in engine load, a reduction in weight, an enhanced steering stability and a quick restoring force.

The EPS system is configured such that an Electronic Control Unit (ECU) drives a motor in response to steering conditions detected by a speed sensor, a torque angle sensor and a torque sensor to enhance a steering stability and provide a quick restoring force, whereby a driver can safely steer a vehicle.

The EPS system is also configured such that a motor assists a torque manipulating a steering wheel to allow a driver to steer a vehicle with less power, where the motor employs a Brushless Direct Current (BLDC) motor.

The BLDC motors have been increasingly used because the brushless motors are excellent in maintenance property, have a small size, and are capable of generating a high torque.

The BLDC motor generally forms an exterior look by coupling of a housing and a cover member, where an inner circumferential surface of the housing is provided with a stator, and the stator is centrally formed with a rotor rotatably mounted in electrical interaction with the stator. The rotor is rotatably supported by a rotation shaft, and an upper surface of the rotation shaft is connected by a steering shaft of a vehicle to provide a power assisting the steering of the vehicle as mentioned above.

Meanwhile, the cover member is installed at an inner side with a PCB (Printed Circuit Board) mounted with a detecting sensor provided by a magnetic element. The detecting sensor serves to detect a magnetic force of a sensing magnet rotatably mounted with the rotor to learn a current position of the rotor. Generally, the sensing magnet is fixed to an upper surface of a plate mounted at an upper surface of the rotor using an adhesive. In a case the sensing magnet is magnetized to the plate, the plate is coupled to a rotation shaft in tune with a direction of magnetic field to detect a position of the rotor.

Meanwhile, as mentioned above, the plate and the sensing magnet are coupled using an adhesive. Thus, it is difficult to manage an accurate adhering process, whereby the sensing magnet may be easily dislodged. Particularly, in view of vehicular characteristics of varying environmental conditions, and in light of the coupled relationship being maintained only by an adhesive power alone of the adhesive, if the motor is alternatively used in between a high temperature state and a low temperature state, or is exposed to a high temperature state for a long time, the adhesive power of the adhesive deteriorates to cause the sensing magnet to be dislodged or to disable a motor driving.

This structure suffers from a difficulty in selecting a right adhesive, leading to an economic problem of using a high cost adhesive, and a more accurate operation in adhesive coating processing. Furthermore, in a case the plate and the sensing magnet are being pressed while the adhesive is coated on a flat surface of a magnet, or in a case an adhesive is thickly coated, the adhesive coated on the surface of the magnet may leak out of an adhered part, or an excessively thick adhesive layer may be formed to cause a Hall element and a sensing magnet to be excessively closely arranged or to be mutually interfered.

BRIEF SUMMARY

The present disclosure is directed to cope with the abovementioned problems/disadvantages and it is an object of the present disclosure to provide a sensing magnet apparatus for motor improved in a coupling structure between a sensing magnet and a plate to thereby be free from separation of the sensing magnet regardless of use under a high temperature for a long time, or use under an environmental condition of severe temperature changes.

Technical problems to be solved by the present disclosure are not restricted to the abovementioned description, and any other technical problems not mentioned so far will be clearly appreciated from the following description by the skilled in the art.

In a general aspect of the present disclosure, there is provided a sensing magnet apparatus for an motor, the apparatus comprising: a disk-shaped plate centrally inserted by a rotation shaft; and a ring-shaped sensing magnet integrally formed with the plate by an insert injection molding process while the plate is being inserted in a mold, formed at a position near to a periphery with a main magnet, and formed at a position near to a through hole with a sub magnet, where the sensing magnet wraps both a front surface and a rear surface of the plate through the insert injection molding process.

Preferably, but not necessarily, the plate is formed with a metal material and surface-contacted by the sensing magnet at both the front and rear surfaces.

In a second general aspect of the present disclosure, there is a sensing magnet apparatus for an motor, the apparatus comprising: a disk-shaped plate centrally inserted by a rotation shaft; a ring-shaped sensing magnet formed at an upper surface of the plate for surface-contact, formed at a position near to a periphery with a main magnet, and formed at a position near to a through hole with a sub magnet; and a grip unit complementarily formed with the plate and the sensing magnet to physically grip the plate and the sensing magnet.

Preferably, but not necessarily, the grip unit includes a first grip unit complementarily formed with the plate and a second grip unit formed at an opposite side of the first grip unit.

Preferably, but not necessarily, the first grip unit includes a grip rib extensively formed at a peripheral side of the plate, bent to a direction facing the sensing magnet and formed thereinside with an accommodation groove unit; and a fixing protrusion formed at position corresponding to that of the grip rib of the sensing magnet and inserted into the accommodation groove unit.

Preferably, but not necessarily, the second grip unit includes a bending protrusion formed at an opposite side of a formed area of the grip rib, as a periphery of the plate, and a lug accommodation groove formed at a position corresponding to that of the bending protrusion of the sensing magnet for the bending protrusion to be fixed and accommodated by being bent and caulked.

In a third general aspect of the present disclosure, there is a sensing magnet apparatus for an motor, the apparatus comprising a grip unit including a plurality of bending protrusions protrusively formed at a periphery of the plate each at a predetermined distance, and a lug accommodation groove formed at a position corresponding to that of the bending protrusion of the sensing magnet for the bending protrusion to be fixed and accommodated by being bent and caulked.

Preferably, but not necessarily, at least three bending protrusions are protrusively formed at the periphery of the plate, and the main magnet is arranged at a position not interfered with the bending protrusion when the sensing magnet is gripped by bending the bending protrusion.

Preferably, but not necessarily, the plate is so formed as to have a diameter equal to that of the sensing magnet, and thickness of the sensing magnet is thicker than that of the plate.

In a fourth general aspect of the present disclosure, there is a sensing magnet apparatus for an motor, the apparatus comprising: a disk-shaped plate centrally inserted by a rotation shaft; a ring-shaped sensing magnet formed at an upper surface of the plate for surface-contact, formed at a position near to a periphery with a main magnet, and formed at a position near to a through hole with a sub magnet; and a plurality of through holes penetratively formed at the plate, wherein the sensing magnet is so formed as to fill an interior of the through hole through an insert injection molding process.

Preferably, but not necessarily, the plate is formed with a metal material.

Preferably, but not necessarily, each of the through holes is penetratively formed at a position near to the periphery of the plate at a predetermined distance Preferably, but not necessarily, each of the through holes is formed in any one form of a circle, a triangle and a polygon.

Preferably, but not necessarily, the sensing magnet covers at least one entire surface of the plate.

Preferably, but not necessarily, the plate is so formed as to have a diameter smaller than that of the sensing magnet.

In a fifth general aspect of the present disclosure, there is a sensing magnet apparatus for an motor, the apparatus comprising: a disk-shaped plate centrally inserted by a rotation shaft; a ring-shaped sensing magnet formed at an upper surface of the plate for surface-contact, formed at a position near to a periphery with a main magnet, and formed at a position near to a through hole with a sub magnet, wherein the sensing magnet surface-contacts a tooth-shaped uneven (凹凸) structure through an injection molding process.

Preferably, but not necessarily, the plate is formed with a metal material, and the tooth-shaped uneven (凹凸) structure is formed at a predetermined distance on the periphery of the plate.

Preferably, but not necessarily, the sensing magnet is so formed as to wrap at least one surface of the plate.

Preferably, but not necessarily, the plate is so formed as to have a diameter smaller than that of the sensing magnet.

In a sixth general aspect of the present disclosure, there is a sensing magnet apparatus for an motor, the apparatus comprising a plate including a plurality of through holes, each hole being penetratively formed at a position near to the periphery of the plate at a predetermined distance, and ratio of the number of teeth forming the through holes and a tooth-shaped uneven (凹凸) structure is 1:2.

The sensing magnet apparatus for motor according to the present disclosure has an advantageous effect in that the sensing magnet can be formed on a plate through insert injection molding process without use of an adhesive to inhibit the plate and a magnet from being separated due to deteriorated adhesive force of the adhesive caused by high speed rotation, a long time use or use under a high temperature state.

Another advantage is that no assembly device is needed for adhering the sensing magnet to the plate using an adhesive to manufacture the plate and the sensing magnet in a single part, whereby a manufacturing cost can be reduced and an assembly process can be simplified.

BRIEF DESCRIPTION OF THE DRAWINGS

The accompanying drawings, which are included to provide further understanding of the present disclosure and are incorporated in the present disclosure and constitute a part of this application, and together with the description, serve to explain the principle of the disclosure. In the drawings.

DETAILED DESCRIPTION

Advantages and features of the present invention may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification. The terms "a" and "an" herein do not denote a limitation of quantity, but rather denote the presence of at least one of the referenced item.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera.

Now, a sensing magnet apparatus for an EPS motor according to the exemplary embodiments of the present disclosure will be described in detail with reference to the accompanying drawings.

Figure 1:
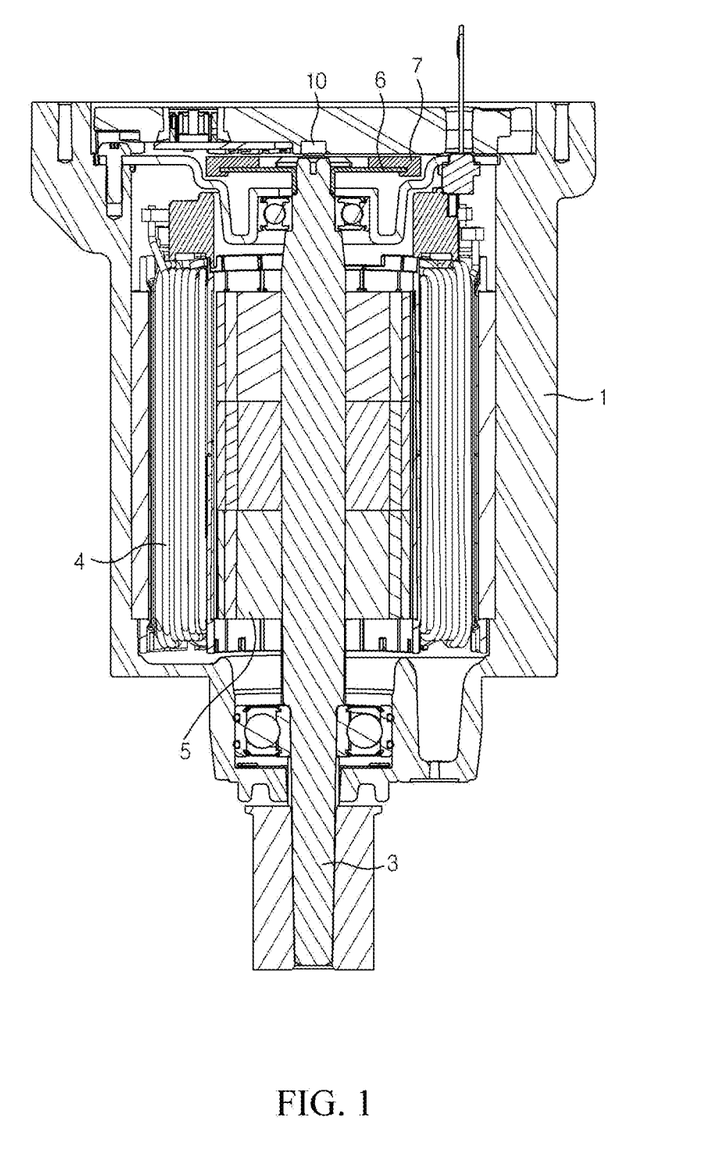
FIG. 1 is a schematic cross-sectional view illustrating an EPS motor according to an exemplary embodiment of the present disclosure.
Figure 2:
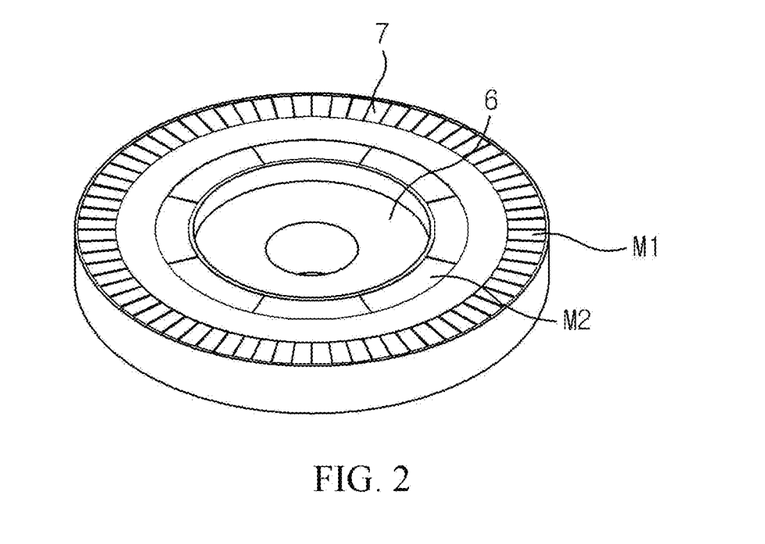
FIG. 2 is a perspective view illustrating a sensing magnet according to a first exemplary embodiment of the present disclosure.
Figure 3:
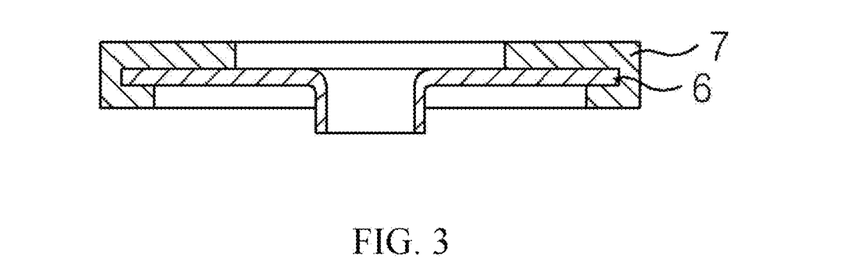
FIG. 3 is a cross-sectional view of FIG. 2.
Figure 4:
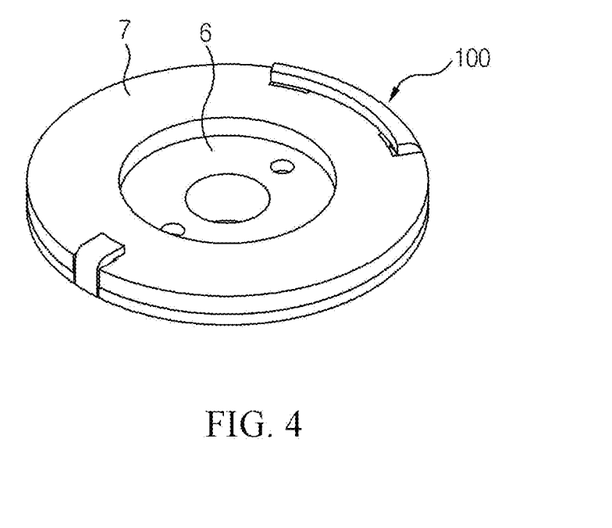
FIG. 4 is a perspective view illustrating a sensing magnet according to a second exemplary embodiment of the present disclosure.
Figure 5:
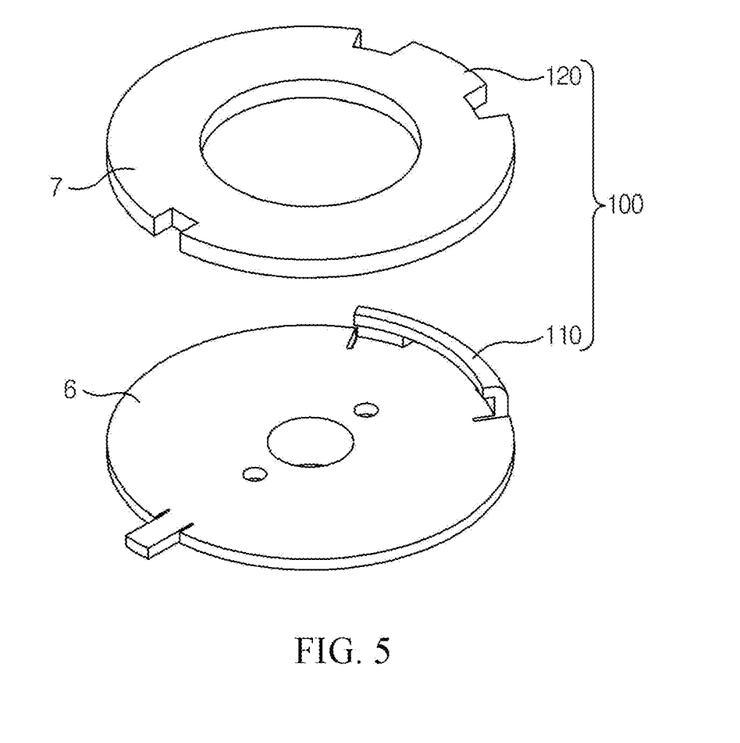
FIG. 5 is an exploded perspective view of FIG. 4.
Figure 6:
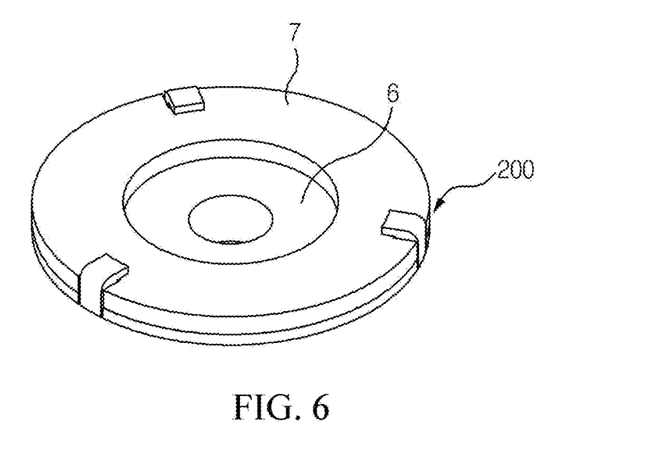
FIG. 6 is a perspective view illustrating a sensing magnet according to a third exemplary embodiment of the present disclosure.
Figure 7:
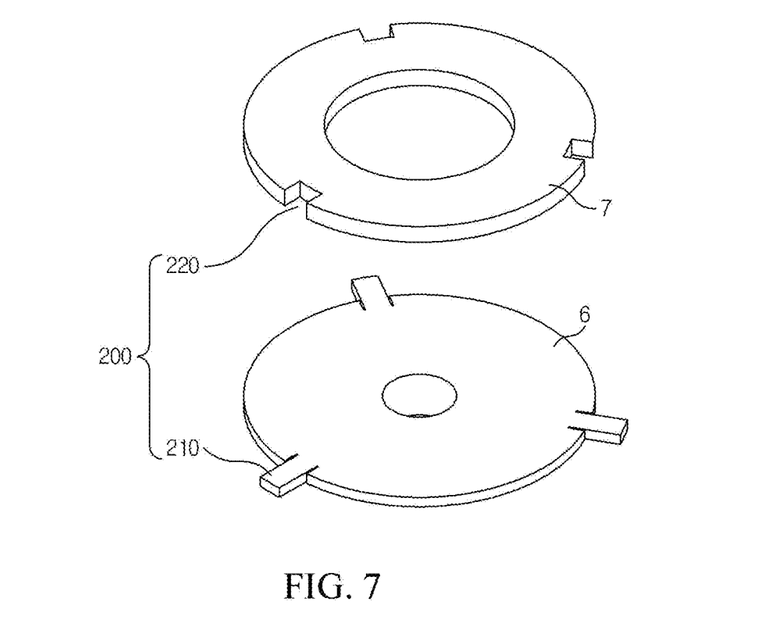
FIG. 7 is an exploded perspective view of FIG. 6.

FIG. 1 is a schematic cross-sectional view illustrating an EPS motor according to an exemplary embodiment of the present disclosure, FIG. 2 is a perspective view illustrating a sensing magnet according to a first exemplary embodiment of the present disclosure, FIG. 3 is a cross-sectional view of FIG. 2, FIG. 4 is a perspective view illustrating a sensing magnet according to a second exemplary embodiment of the present disclosure, FIG. 5 is an exploded perspective view of FIG. 4, FIG. 6 is a perspective view illustrating a sensing magnet according to a third exemplary embodiment of the present disclosure, and FIG. 7 is an exploded perspective view of FIG. 6.

Referring to FIG. 1, an EPS motor according to an exemplary embodiment of the present disclosure includes a housing (1), a cover member (not shown) coupled to an upper surface of the housing (1), and a coupling of the housing (1) and the cover member forms an exterior look of the motor.

A bracket (2) is formed at a lateral surface of the housing (1), a stator (4) wound by a plurality of coils is provided at an inner surface of the housing (1), and the stator (4) is centrally provided with a rotor (5) rotatable by a rotation shaft (3). The rotor (5) may be formed by coupling a rotor core with a magnet. The rotor core and the magnet may be integrally formed as circumstances require.

The rotor (5) is provided at an upper surface with a sensing magnet (7) coupled with a plate (6) for obtaining position information of the rotor (5). Referring to FIGS. 1 and 2, the plate (6) is provided in a disk shape, and may be coupled by the rotation shaft (3) and a coupling member (10). The plate (6) is preferably formed with a metal material, and may be substantially provided in a disk shape, as shown in FIGS. 2, 3 and 4.

The plate (6) is coaxially formed with the sensing magnet (7). The plate (6) is rotated in association with rotation of the rotation shaft (3) to allow rotating the sensing magnet (7).

The sensing magnet (7) may be provided in a disk shape having an extreme outer diameter corresponding to a diameter of the plate (6), and centrally formed with a through hole having a predetermined size of a diameter to allow the rotation shaft (3) fixed to the plate (6) to pass therethrough. A main magnet (M1) may be provided at a position near to a periphery of the sensing magnet (7), and a sub magnet (M2) may be provided at a position near to the through hole. The sensing magnet (7) is mounted at an upper surface with a magnetic element (not shown) such as a Hall element (Hall IC) at a PCB (Printed Circuit Board) fixed to an inner surface of the cover member to face the sensing magnet (7), whereby rotation of the sensing magnet (7) can be detected.

Meanwhile, the sensing magnet (7) may be configured to wrap at least one surface of the plate (6), or may be configured to wrap an entire surface of the plate (6) as shown in FIG. 1. However, an influence of a centrifugal force generated by rotor rotation acting to a circumferential direction from a center of a disk-shaped body being very great, the sensing magnet (7) needs not to be formed to allow the plate (6) to be a core, and may be sufficient enough to form an integral body.

A holder member (10) is coupled to an upper surface of the sensing magnet (7) to allow the sensing magnet (7) to maintain a constant position. The holder member (10) is not an essential element and may be deleted from the configuration of the present disclosure, if necessary. The holder member (10) may be fixed to the plate (6) by a fixing unit (not shown) like a fastening bolt. The holder member (10) may be formed with an elastic material like a thin metal leaf plate to allow being elastically deformed when fastened by the fixing unit, whereby the position of the sensing magnet (7) can be fixed using a restoring force of the holder member (10).

The present disclosure is characterized by providing a separation inhibition unit, whereby the plate (6) and the sensing magnet (7) can be physically coupled without using an adhesive.

According to a first exemplary embodiment of the present disclosure, in order to further tighten or reinforce a coupled state between the plate (6) and the sensing magnet (7), as illustrated in FIGS. 2 and 3, the plate (6) is arranged inside a mold to allow the plate (6) to be a core, the sensing magnet (7) is injection molded along with the plate (6) to allow the sensing magnet (7) and the plate (6) to be a one body. In this case, as shown in FIG. 3, the sensing magnet (7) may be injection molded in the form of wrapping both a front surface and a rear surface of the plate (6).

According to this configuration, the sensing magnet (7) is formed in a shape wrapping the front and rear surfaces of the plate (6) connected to the rotation shaft (3), whereby even if the motor is rotated at a high speed, the sensing magnet (7) and the plate (6) can be inhibited from being separated by a centrifugal force. Furthermore, no separation between the sensing magnet (7) and the plate (6) caused by deteriorated adhesive performance under a high temperature environment can be generated because of no use of adhesive.

FIG. 4 is a perspective view illustrating a sensing magnet according to a second exemplary embodiment of the present disclosure, and FIG. 5 is an exploded perspective view of FIG. 4, FIG. 6 is a perspective view illustrating a sensing magnet according to a third exemplary embodiment of the present disclosure.

Referring to FIGS. 4 and 5, a separation inhibition unit inhibiting the sensing magnet (7) from being separated from the plate (6) includes first and second grip units (100, 200). The first grip unit (100) may include a grip rib (110) protrusively formed at one side of the periphery of the plate (6), and at least one fixing protrusion (120) insertedly coupled to the grip rib (110).

The fixing protrusion (120) is formed by partially extending a distal end of the periphery of the plate (6), the extended end is bent to a direction facing the sensing magnet (7), and an insertion groove for inserting the fixing protrusion (120) is formed. The fixing protrusion (120) is formed at a periphery facing the grip rib (110) of the sensing magnet (7).

According to an exemplary embodiment of the present disclosure, at least two tooth-shaped uneven (凹凸) structure may be formed at left and right ambient of the fixing protrusion (120) to allow the fixing protrusion (120) to be insertedly coupled to an insertion groove formed with the grip rib (110).

The second grip unit (200) is formed at an opposite side of the first grip unit (100), and includes a bending protrusion (210) and a lug accommodation groove (220) inserted by the bending protrusion (210). The bending protrusion (210) is provided at an opposite side of a position formed with the grip rib (110) at the periphery of the plate (6), and may be formed with a length shorter than a length of the grip rib (110) as shown in FIGS. 4 and 5.

The lug accommodation groove (220) is formed to have a width corresponding to that of the bending protrusion (210), and in a case the bending protrusion (210) is bent to grip the sensing magnet (7), the bending protrusion (210) may be accommodated inside the lug accommodation groove (220).

Meanwhile, the bending protrusion (210) may be so configured as to allow the sensing magnet (7) and the plate (6) to be physically coupled through a caulking process if accommodated into the lug accommodation groove (220) by bending.

According to the present disclosure, the first grip unit (100) can maintain a tight coupled state with only one time of caulking process of the second grip unit (200), even if there is no separate fixation operation like the caulking process. Particularly, as illustrated in the first exemplary embodiment, no adhesive is used to rule out a separation problem between the sensing magnet (7) and the plate (6) caused by temperature changes.

FIG. 6 is a perspective view illustrating a sensing magnet according to a third exemplary embodiment of the present disclosure and FIG. 7 is an exploded perspective view of FIG. 6.

Referring to FIGS. 6 and 7, the first grip unit (100) is deleted and only a plurality of second grip units (200) is provided to physically fix the sensing magnet (7) and the plate (6).

That is, as shown in FIG. 6, at least three or more bending protrusions (210) may be formed at the periphery of the plate (6) and the lug accommodation groove (220) may be formed at a position corresponding to that of the bending protrusion (210) of the sensing magnet (7). A plurality of second grip units (200) may be provided. Although a coupling force may be improved if formed with more number of second grip units, there is a fear of damaging the sensing magnet (7) amidst the caulking process of the bending protrusion (210), and therefore an adequate number of second grip units (200) may be preferably formed. Three second grip units (200) may be symmetrically arranged each at a predetermined distance of 180° about the rotation shaft (3), as shown in FIG. 6.

Figure 8:
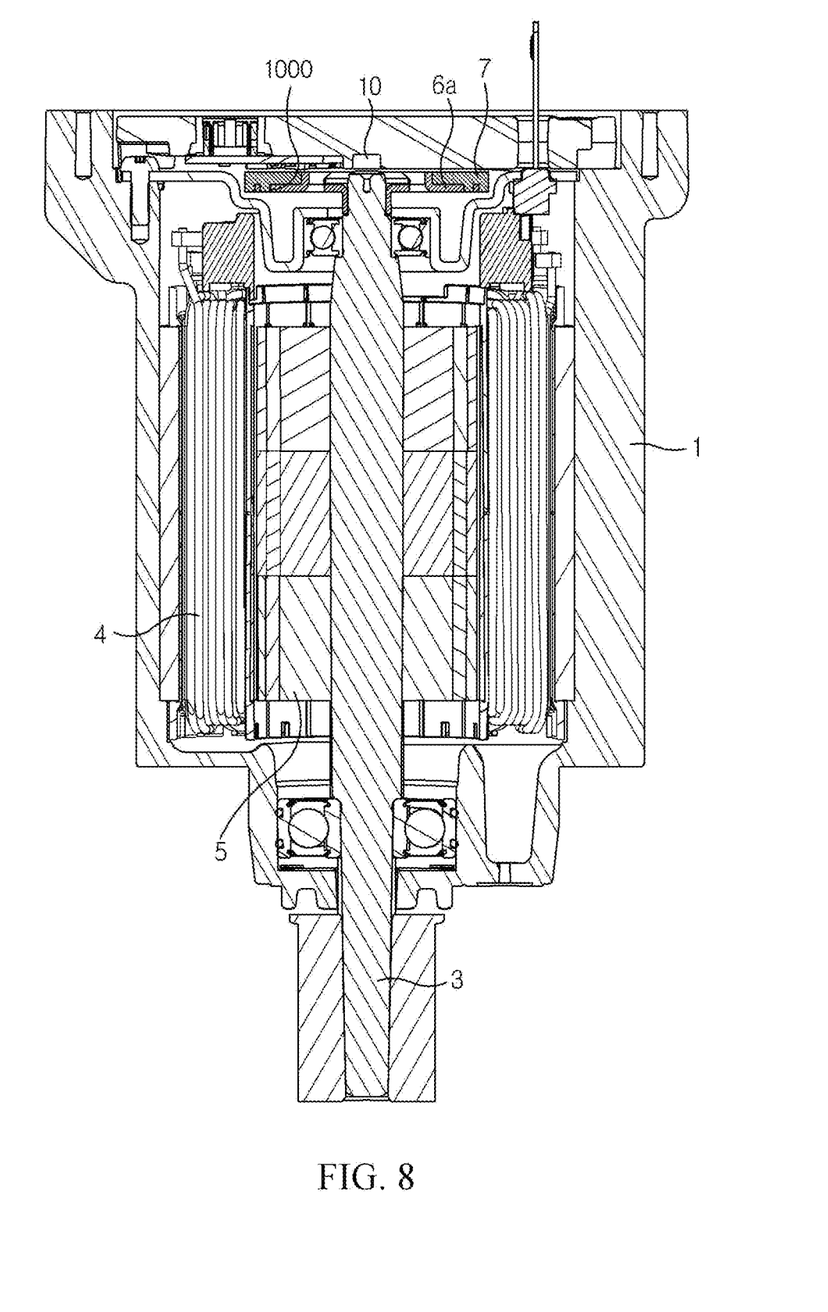
FIG. 8 is a schematic cross-sectional view illustrating an EPS motor according to an exemplary embodiment of the present disclosure.
Figure 9:
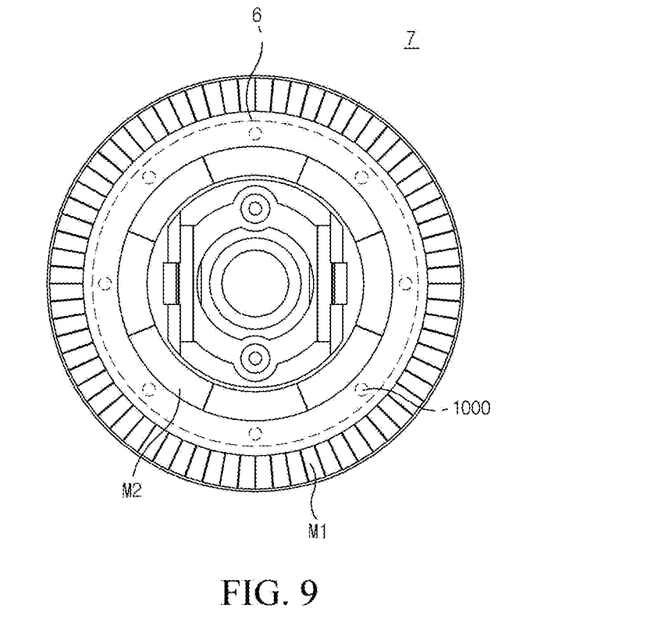
FIG. 9 is a plan view illustrating a sensing magnet according to a fourth exemplary embodiment of the present disclosure.
Figure 10:
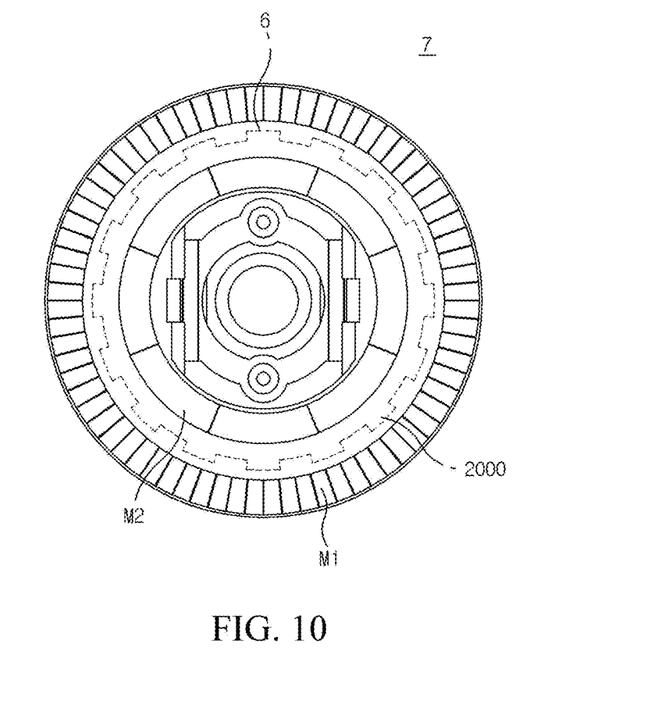
FIG. 10 is a plan view illustrating a sensing magnet according to a fifth exemplary embodiment of the present disclosure.
Figure 11:
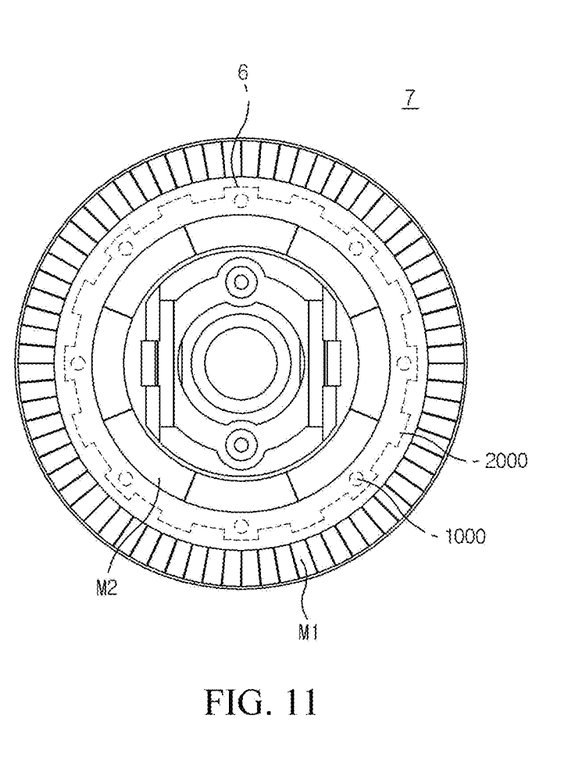
FIG. 11 is a plan view illustrating a sensing magnet according to a sixth exemplary embodiment of the present disclosure.

FIG. 8 is a schematic cross-sectional view illustrating an EPS motor according to an exemplary embodiment of the present disclosure, FIG. 9 is a plan view illustrating a sensing magnet according to a fourth exemplary embodiment of the present disclosure, FIG. 10 is a plan view illustrating a sensing magnet according to a fifth exemplary embodiment of the present disclosure, and FIG. 11 is a plan view illustrating a sensing magnet according to a sixth exemplary embodiment of the present disclosure.

Referring to FIG. 8, an EPS motor according to an exemplary embodiment of the present disclosure includes a housing (1), a cover member (not shown) coupled to an upper surface of the housing (1), and a coupling between the housing (1) and the cover member forms an exterior look of the motor.

A bracket (2) is formed at a lateral surface of the housing (1), a stator (4) wound by a plurality of coils is provided at an inner surface of the housing (1), and the stator (4) is centrally provided with a rotor (5) rotatable by a rotation shaft (3). The rotor (5) may be formed by coupling a rotor core with a magnet. The rotor core and the magnet may be integrally formed as circumstances require.

The rotor (5) is provided at an upper surface with a sensing magnet (7) coupled with a plate (6) for obtaining position information of the rotor (5).

Referring to FIGS. 8 and 9, a disk plate (6a) according to the fourth exemplary embodiment of the present disclosure may be provided in a disk shape and coupled to the rotation shaft (3) using a coupling member (10). The disk plate (6a) may be formed with a metal material. The disk plate (6a) is arranged in a mold before sintering and/or injection molding process, where the disk plate (6a) may become a core to be integrally injection-molded along with the sensing magnet (7).

The sensing magnet (7) may be provided in a disk shape having a diameter corresponding to a diameter of the disk plate (6a), and centrally formed with a through hole having a predetermined size of a diameter to allow the rotation shaft (3) fixed to the disk plate (6a) to pass therethrough. A main magnet (M1) may be provided at a position near to a periphery of the sensing magnet (7), and a sub magnet (M2) may be provided at a position near to the through hole. The sensing magnet (7) is mounted at an upper surface with a magnetic element (not shown) such as a Hall element (Hall IC) at a PCB (Printed Circuit Board) fixed to an inner surface of the cover member to face the sensing magnet (7), whereby rotation of the sensing magnet (7) can be detected.

Meanwhile, the sensing magnet (7) may be configured to wrap at least one surface of the disk plate (6a), or may be configured to wrap an entire surface of the disk plate (6a), if necessary. However, an influence of a centrifugal force generated by rotor rotation acting to a circumferential direction from a center of a disk-shaped body being very great, the sensing magnet (7) needs not to be essentially formed to allow the plate (6) to be a core, and may be sufficient enough to form an integral body by an insert injection molding process to thereby simplify an assembly process by reducing the number of parts and to reduce the manufacturing cost.

Furthermore, in order to further tighten or reinforce a coupled state between the disk plate (6a) and the sensing magnet (7), a plurality of through holes (1000) may be penetratively formed each at a predetermined distance on the disk plate (6a). According to the fourth exemplary embodiment of the present disclosure, approximately eight through holes (1000) may be penetratively formed each at a predetermined distance. However, the present disclosure is not limited thereto, and the number of through holes (1000) may be increased or decreased based on the size of the disk plate (6a).

The through holes may be formed in a circular shape as shown in FIG. 9. However, the present disclosure is not limited thereto, and the through holes may be formed in a triangular shape, a square shape, a polygonal shape or an oval shape, if necessary. The through holes (1000) may be simply configured using a press work in a case the disk plate (6a) is formed with a metal material.

The through holes (1000) may tightly maintain a coupled state between the sensing magnet (7) and the disk plate (6a), in a case materials forming the sensing magnet (7) are formed by passing the through holes (1000) when the sensing magnet (7) is sintered and/or injection molded.

Meanwhile, as shown in FIGS. 8 and 9, preferably the through holes (1000) are penetratively formed at an area near to the periphery of the disk plate (6a), which is to provide a further tightened coupling force by being formed a distal end of a circumference where the centrifugal force is greatly acted on, because the disk plate (6a) and the sensing magnet (7) are disk-shaped.

According to the fifth exemplary embodiment of the present disclosure, instead of the through holes (1000) according to the fourth exemplary embodiment, a tooth-shaped plate (6b) formed with a tooth-shaped uneven (凹凸) structure (2000) may be provided at a periphery as shown in FIG. 10. The tooth-shaped plate (6b) formed with a tooth-shaped uneven (비녀) structure (2000) can broaden an area meshed by the tooth-shaped plate (6b) and the sensing magnet (7) at the periphery to thereby expect a reinforced coupling force as a result of increased contact area.

Meanwhile, the number of teeth forming the uneven (凹凸) structure (2000) needs to be adequately provided. If the number of teeth is increased, the contact area may be broadened but strength of each tooth may decrease. Alternatively, if the number of teeth forming the uneven (凹凸) structure (2000) is excessively decreased, the coupling force has no great effect due to decreased contact area.

The number of teeth forming the uneven (凹凸) structure (2000) according to the fifth exemplary embodiment of the present disclosure may be preferably greater than that of the fourth exemplary embodiment, and a total of 16 teeth may be provided about the toothed plate (6b), for example.

The sixth exemplary embodiment of the present disclosure may be configured to include all the structures of the first and fifth exemplary embodiments. That is, a hybrid plate (6c) may be formed with the through hole (1000) formed at a position near to the periphery and the tooth-shaped uneven (凹凸) structure (2000) formed at the periphery. In this case, there is no fear of the sensing magnet (7) and the hybrid plate (6c) being separated from a rotating motor at a high speed.

The teeth forming the through holes (1000) and the tooth-shaped uneven (凹凸) structure (2000) may be formed at a predetermined ratio, and the ratio of the number of teeth forming the through holes (1000) and the tooth-shaped uneven (비녀) structure (2000) may be 1:2 according to the sixth exemplary embodiment of the present disclosure.

According to the abovementioned configuration, the plate (6) and the sensing magnet (7) are physically coupled by bending and caulking processes of the second grip unit (200) while the sensing magnet (7) and the plate (6) are being surface-contacted to inhibit the sensing magnet (7) from being separated due to performance changes in adhesive under a high temperature environment, as in the first and second exemplary embodiments of the present disclosure.

Furthermore, an adhesive process of the sensing magnet (7) using an adhesive can be omitted to further simplify the assembly process, whereby a cumbersomeness of using a high priced adhesive in response to motor driving condition can be eliminated.

Meanwhile, although the present disclosure has exemplified an EPS motor, the present disclosure is not limited thereto. The present disclosure may be applied to any motor having a motor structure with a sensing magnet (7), if necessary.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A sensing magnet apparatus for a motor, the apparatus comprising:

a plate inserted by a rotation shaft;

a sensing magnet so installed as to surface-contact a surface of the plate, formed at a position near a periphery of a main magnet, and formed at an inner side of the main magnet with a sub magnet; and a separation inhibition unit physically coupling the plate and the sensing magnet to maintain a coupled state between the plate and the sensing magnet, wherein the separation inhibition unit includes a first grip unit formed with both the plate and the sensing magnet, and a second grip unit formed with both the plate and the sensing magnet, wherein the first grip unit includes a grip rib extensively formed at a periphery of the plate, the grip rib bent to a direction facing the sensing magnet and formed thereinside with an accommodation groove unit; and a fixing protrusion formed at the sensing magnet wherein the fixing protrusion is disposed to correspond to the grip rib to be inserted into the accommodation groove unit; and wherein the second grip unit includes a bending protrusion formed on the periphery of the plate at an opposite side of a formed part of the grip rib, and a lug accommodation groove formed at a position corresponding to that of the bending protrusion of the sensing magnet for the bending protrusion to be fixed and accommodated by being bent and caulked; and wherein the first grip unit and the second grip unit are of different shapes.

2. The sensing magnet apparatus of claim 1, wherein the separation inhibition unit is provided in an insert molded sensing magnet wrapping both a front surface and a rear surface of the plate, and the plate surface-contacts the sensing magnet at both the front and rear surfaces.

3. The sensing magnet apparatus of claim 1, wherein the plate is so formed as to have a diameter equal to that of the sensing magnet.

4. The sensing magnet apparatus of claim 1, wherein thickness of the sensing magnet is thicker than that of the plate.

5. The sensing magnet apparatus of claim 1, wherein the separation inhibition unit includes a plurality of through holes penetratively formed at the plate, and the sensing magnet is so formed as to fill an interior of the through hole through an insert injection molding process.

6. The sensing magnet apparatus of claim 5, wherein each of the through holes is penetratively formed at a position near to the periphery of the plate at a predetermined distance, and is formed in any one form of a circle, a triangle and a polygon.

7. The sensing magnet apparatus of claim 1, wherein the sensing magnet covers at least one entire surface of the plate, and is greater than a thickness of the plate.

8. The sensing magnet apparatus of claim 1, wherein the separation inhibition unit further includes a plurality of tooth-shaped uneven structures formed at a predetermined distance on a periphery of the plate, and the sensing magnet surface-contacts the tooth-shaped uneven structures through an insert injection molding process;

wherein the plate includes a plurality of through holes penetratively formed at a position near the periphery of the plate, each through hole being at a predetermined distance, and the sensing magnet is so formed as to fill an interior of the through hole through the insert injection molding process; and wherein a ratio of number of the through holes to number of teeth forming the tooth-shaped uneven structures is 1:2.

* * * * *